United States Patent [19]

Kluth et al.

[11] 4,334,787
[45] Jun. 15, 1982

[54] TWO-COMPONENT DOSING APPARATUS

[75] Inventors: Hermann Kluth; Robert Bachmann; Jürgen Wegner, all of Düsseldorf, Fed. Rep. of Germany

[73] Assignee: Henkel Kommanditgesellschaft auf Aktien, Düsseldorf-Holthausen, Fed. Rep. of Germany

[21] Appl. No.: 162,206

[22] Filed: Jun. 23, 1980

[30] Foreign Application Priority Data

Jul. 7, 1979 [DE] Fed. Rep. of Germany ....... 2927584

[51] Int. Cl.³ .................... B01F 15/02; B01F 15/04
[52] U.S. Cl. ............................... 366/162; 222/319; 222/390; 422/224; 366/178; 366/334; 366/337
[58] Field of Search .............. 366/162, 160, 161, 340, 366/332, 333, 334, 184, 186, 178, 189, 337, 190, 255, 259, 256, 267, 268, 269, 129, 130, 341, 340; 222/319, 252, 390; 422/224

[56] References Cited

U.S. PATENT DOCUMENTS

| | | | |
|---|---|---|---|
| 1,576,822 | 3/1926 | Hayden | 222/390 |
| 2,814,827 | 12/1957 | Snow | 222/390 X |
| 3,239,100 | 3/1966 | Peterson | 222/57 |
| 3,717,306 | 2/1973 | Hushon et al. | 239/404 |
| 4,029,236 | 6/1977 | Carson et al. | 222/135 |
| 4,202,635 | 5/1980 | Hendrickson | 366/162 |
| 4,208,133 | 6/1980 | Hans | 366/256 |

Primary Examiner—Robert W. Jenkins
Attorney, Agent, or Firm—Hammond & Littell, Weissenberger & Muserlian

[57] ABSTRACT

In a device for dosing two-component products of a predetermined mixing ratio, the dispensing accuracy has been improved in conjunction with simple design and uncomplicated operation. According to the invention, two chambers are provided which are put under pressure by means of two pistons that are displaced simultaneously in opposite directions from a starting point. A mixer means is arranged at the closed longitudinal end of a first chamber, while the closed longitudinal end of the other chamber is connected to the mixer means over a component line that leads centrally through the first chamber.

6 Claims, 3 Drawing Figures

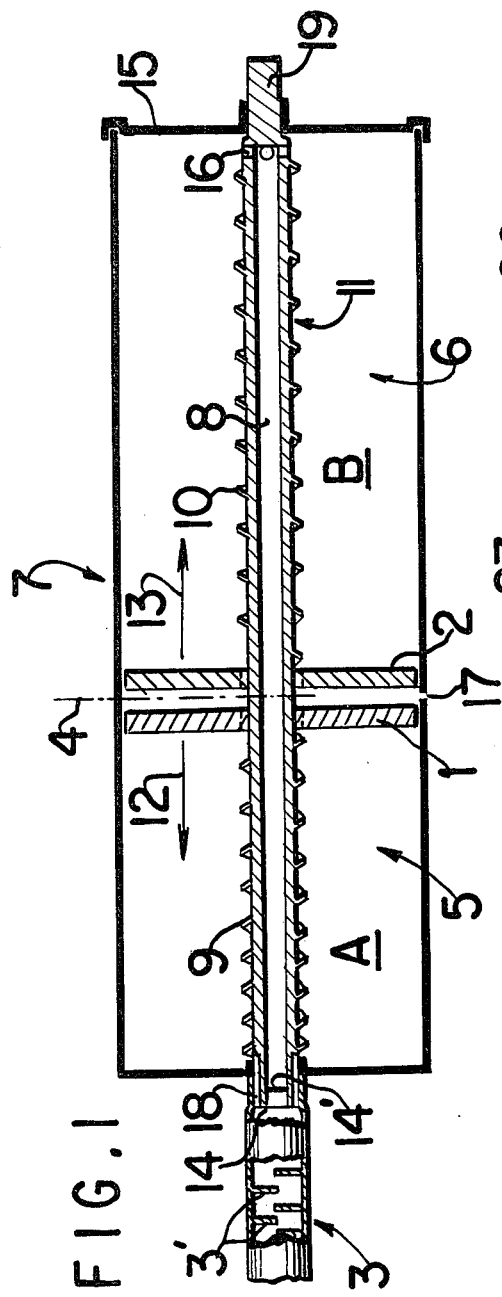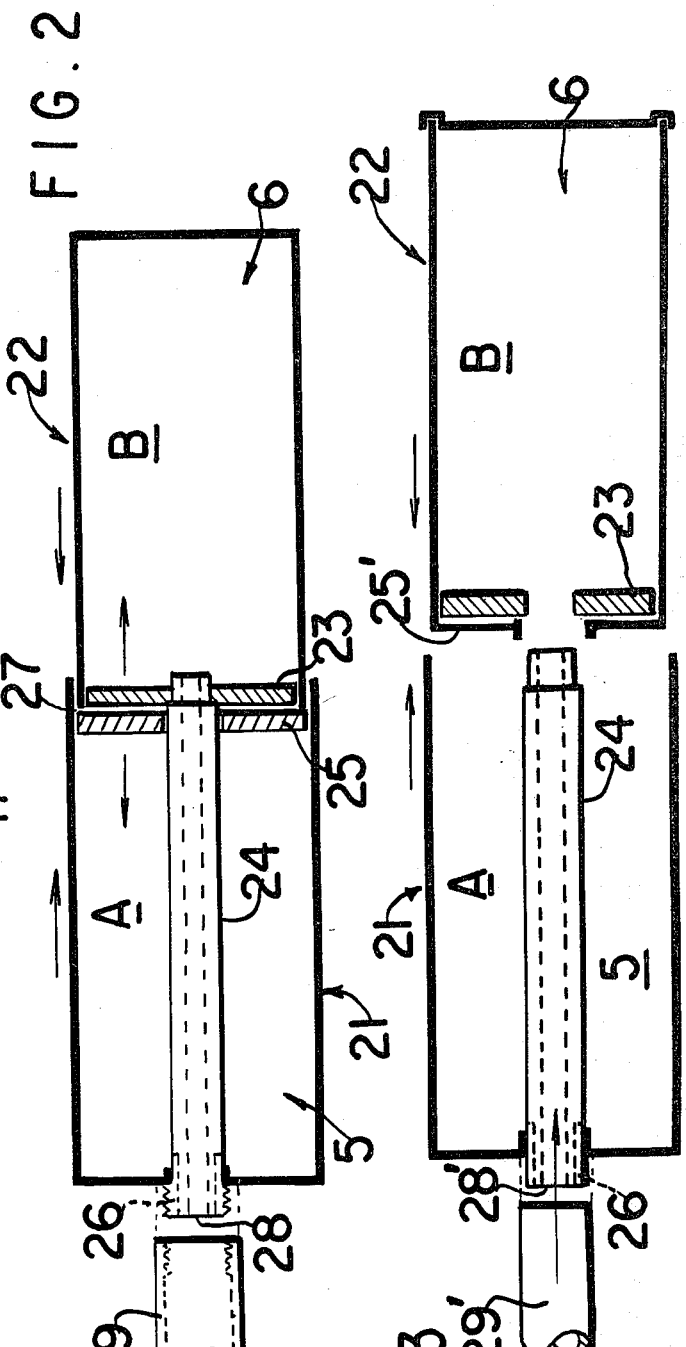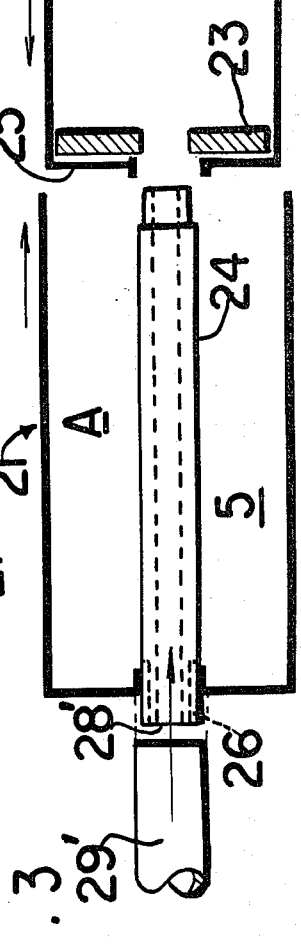

TWO-COMPONENT DOSING APPARATUS

FIELD OF THE INVENTION

This invention relates to a dosing apparatus for mixing two components which should not be combined prior to use. More particularly, this invention relates to an apparatus for dosing two-component products in a predetermined mixing ratio by employing pistons to move the individual components and combining the components in a mixer means.

BACKGROUND OF THE INVENTION

Devices for mixing two liquid or fluid components, particularly resin and hardeners, are known. Because of undesired, premature reaction between the components, the mixing can be effected just before use, preferably in a certain mixing ratio, to achieve an optimum effect. According to previously known devices for dosing, i.e., determining, and depositing a certain mixing ratio, liquid to gelatinous ropes of the two components have been forced from tubes or cylindrical containers by means of pistons and mixed with each other. The known devices have either the disadvantage of a relatively inaccurate dosing and deposition of the mixing ratio or the requirement that special means are necessary for emptying. In some devices the entire contents must be used up at once.

OBJECTS OF THE INVENTION

It is an object of the invention to provide a novel apparatus for dosing two-component products.

It is also an object of the invention to provide an apparatus whereby two components can be contacted and mixed according to a predetermined ratio and delivered.

These and other objects of the invention will become more apparent in the discussion below.

BRIEF DESCRIPTION OF THE DRAWINGS

FIG. 1 represents a cross-sectional view of an embodiment of the invention having a common cylinder.

FIGS. 2 and 3 each represent a cross-sectional view of an embodiment of the invention having a separate cylinder pot for each chamber.

DETAILED DESCRIPTION OF THE INVENTION

Applicants have surprisingly developed a two-component dosing device which, on the one hand, can be handled in a very simple manner, for example, with one manipulation, and which, on the other hand, ensures the exact setting of the desired mixing ratio and of the total amount of the components to be combined. A device according to the invention comprises two chambers which are separated by a pair of pistons to be displaced simultaneously in opposite directions from a starting position. A mixer means is arranged at the other longitudinal end of a first chamber, and a component line connects the other chamber with the mixer means and leads centrally through the first chamber.

Since the two pistons must be moved simultaneously, the combination and mixing of the two components can be effected with a single manipulation. When this is done and an amount of each of the components corresponding to the respective movement is fed to the mixer means, a fixed mixing ratio which is independent of the discretion of the operator and which can be predetermined by the mechanical design of the piston drives and/or the geometry of the chambers, is obtained.

According to another aspect of the invention, the two chambers are part of a single cylinder which is divided in longitudinal direction by a pair of pistons. A hollow spindle whose outside has areas with contrarotating threads preferably functions (1) as a common drive of the two pistons moving in opposite directions and (2) at the same time as a component line to feed the mixer means. On one longitudinal end of this screw spindle a mixer nozzle designed as a cartridge opening is preferably attached. The longitudinal end of the spindle opposite the mixer nozzle preferably has a bore leading radially from the outside into the hollow spindle core for introducing, under pressure, the component contained in the adjacent chamber.

During the rotation of the screw spindle in one direction of rotation, the two pistons attached with a thread to the screw spindle—similar to a rolling spindle—move apart in the direction of the respective longitudinal ends of the cylinder. One longitudinal end of the cylinder is closed, with the exception of an opening of the mixer means or mixer nozzle, while the other end of the cylinder is completely closed. However, near the completely closed longitudinal end, the screw spindle has one or more bores leading to the inner cavity of the spindle. When the screw spindle is operated, one component is therefore forced by one piston out of one chamber directly into the mixer nozzle and the other component is forced out of the other chamber into the hollow core of the spindle and then to the mixer nozzle.

Preferably the ratio of the pitches of the contrarotating parts of the thread of the screw spindle corresponds to the desired mixing ratio of the components to be combined. The ratio of the length of the chambers should correspond to that of the pitches in the corresponding areas of the contrarotating spindle thread. When the spindle is operated properly, both pistons arrive simultaneously at the longitudinal ends of the respective chambers and optimum utilization of the two-component products used is ensured. The device according to the invention is used with, for example, two-component liquid plastics, such as with adhesive-sealing and coating compounds.

To ensure a satisfactory advance of the respective components by means of the two pistons, at least one vent hole should be provided, preferably in the cylinder, ranged between the starting positions of the two pistons, through which air can enter the space between the back sides of the pistons, which space widens in operation.

In another embodiment of the invention, a separate cylinder pot having a sealing piston is provided for each of the two chambers. The cylinder diameter of one, the first cylinder pot, is greater than that of the other, second cylinder pot, and the first cylinder pot is pushed over the latter pot where at its open end the piston of the first cylinder pot is entrained upon a hollow spindle or component line. The first cylinder pot is rigidly connected with the mixer means at its closed end and opens into the mixer means. The hollow spindle or component line is rigidly connected at the other end with the piston of the second cylinder pot, which second cylinder pot opens into the hollow spindle, which in turn leads to the mixer means.

In this device, each of the two pistons is forced in longitudinal and/or axial direction into the other cylinder pot as the cylinder pots are telescoped, i.e., moved overlapping slidably together. As this happens, a predetermined mixing ratio can be maintained or dosed without a special screw mechanism. The mixing ratio of the two components can be readily determined or set by varying the ratio of the respective diameters of the cylinder pots containing the components.

Preferably, the mixer means provided at one longitudinal end of the device is designed as a static mixing tube. In this, or in similar cases, the mixer means itself is preferably so elastic, with regard to at least the outlet of one component, that the component can only issue when a certain minimum pressure is exerted on the component. This prevents undesired, premature admixture and thus reaction of the component. With very large devices or cartridges according to the invention, one longitudinal end of the screw spindle can be designed as a socket for coupling a motor device.

The invention can perhaps be better appreciated by referring to the drawings. In FIG. 1, a device is shown which is intended to dose a two-component product wherein the components are mixed together in a predetermined ratio. Individual components A and B are forced by means of pistons 1 and 2, respectively, to mixer means 3 and combined there. As essential feature is therefore that a single cylinder 7 is provided wherein components A and B in chambers 5 and 6, respectively, separated by pistons 1 and 2, respectively, are displaced simultaneously in opposite direction from a center 4, with a mixer means 3 arranged at the longitudinal cylinder end of one chamber 5 and with a component line 8 connecting the longitudinal cylinder end of the other chamber 6 with the mixer means.

Preferably pistons 1 and 2 are arranged in cylinder 7 on a screw spindle 11 provided with contrarotating threads 9 and 10, respectively, screw spindle 11 being a hollow shaft. As screw spindle 11 is turned, pistons 1 and 2 are moved in opposite directions 12 and 13, respectively, whereby component A issues through several slots 18 provided at the end of screw spindle 11, and then directly from the cartridge outlet or nozzle 14 while component B issues from chamber 6 through one or more principally radial bores 16 of screw spindle 11, the radial bores 16 being next to the longitudinal cylinder wall 15, into and through component line 8 to the mixer means 3. Preferably cylinder 7 has a vent hole 17 radially outside center 4, by means of which air enters and the formation of a vacuum due to the oppositely directed movement of pistons 1 and 2 is prevented.

Mixer means 3 can comprise a static mixing tube that can be attached to outlet 14 for mixing the two components A and B.

The static mixing tube could comprise any of the various tubes known to the art having internal configurations which cause components to admix during passage. For example, the static mixing tube may have stators 3' positioned substantially perpendicularly to the wall of the tube.

Outlet 14 can also be designed in an advantageous manner as an elastic part or member 14' in such a way that one component, for example component B, can only issued under a certain minimum pressure. Elastic part 14' would also prevent, among other things, any undesired reaction of the components by penetration into the other respective chamber or by premature admixture.

The mixing ratio of components A and B can be predetermined, depending on the selection of the ratio of the pitches of threads 9 and 10 in such a way that the correct or optimum ratio is obtained automatically upon actuation. The length of chambers 5 and 6 is preferably so adapted to threads 9 and 10 that the two pistons 1 and 2 arrive simultaneously at the respective cylinder ends when screw spindle 11 is operated.

In the design of the device according to FIG. 1 as a large cartridge, one longitudinal end of screw spindle 11, preferably the end opposite mixer means 3, is provided with an extension 19, for example, a coupling or a socket, for attaching a motor drive. It is also possible to drive the device with a home appliance, such as, for example, an electric drill.

In the embodiment of the invention represented in FIG. 2, separate cylinder pots 21 and 22 contain, or define, chambers 5 and 6, respectively. In cylinder pot 21 with component A, piston 23 is secured to a hollow shaft 24 by means of, for example, a compression joint. A second piston 25 is pushed over hollow shaft 24. Second piston 25 seals toward the wall of cylinder pot 21, while piston 23 seals from another cylinder container or cylinder pot 22. The outside diameter of the second cylinder pot 22 should be at least slightly smaller than the inside diameter of the first cylinder pot 21. At the end of hollow shaft 24 are provided several slots 26 through which component A can be forced by pressure on the second cylinder pot 22. At the same time, component B issues through hollow shaft 24. Components A and B are admixed during passage through mixing means such as static mixing tube 29, which can be screwed, i.e., threaded, onto protruding end or nozzle 28 of hollow shaft 24. Air can enter the space between pistons 23 and 25 through air gap 27 between cartridge parts or cylinder pots 21 and 22, so that no vacuum can be formed when the device, which can also be called a cartridge, is operated.

In addition to the conventional way, the device according to the invention can primarily be filled through the component outlets.

In FIG. 3, the device according to the invention represented is a variant of the device in FIG. 2. Here, piston 25' is an integral part of cylinder pot 22 and mixer means 29' is attached to nozzle 28'. This embodiment permits an even easier prefabrication of the two cylinder pots 21 and 22, while preserving the advantages of the device shown in FIG. 2.

The embodiments of this invention are preferably cylindrical in shape, although the embodiments shown in FIGS. 2 and 3 could be rectangular, square, or oval in latitudinal cross-section. Cylindrical shapes would be easier to manufacture and use. The cartridges of the invention can be virtually any size. Preferably each chamber will be from about 2 to 5 times longer than its diameter. The cartridges may, in actual application, be from about 1 to 6 inches in diameter and from about 6 to 30 inches in length.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An apparatus for dosing a two-component product having a predetermined mixing ratio, which comprises two chambers separated by a pair of sealing pistons, the pistons being displaced simultaneously in opposite directions from a centrum, a mixer means arranged at the outer longitudinal end of a first chamber and communicating with the second chamber, and a component line connecting the second chamber with the mixer means and leading centrally through the first chamber, wherein each chamber comprises a cylinder pot having a sealing piston, the diameter of the first cylinder pot being greater than that of the second cylinder pot, the cylinder pots being arranged so that the first pot slides over the second cylinder pot; wherein the component line comprises a tube leading through the first cylinder, said tube being rigidly connected to and emptying into the mixer means, which is arranged at the closed end of the first cylinder pot, and the piston of the first cylinder pot being entrained upon the tube; and wherein the piston of the second cylinder is rigidly connected to the tube, the second cylinder pot opening into the tube.

2. The apparatus of claim 1, wherein the mixing ratio of the two components is given by the ratio of the diameters of the two cylinder pots.

3. The apparatus of claim 1, wherein the apparatus has at least one vent hole or air gap between the starting positions of the pistons.

4. The apparatus of claim 1, wherein the mixer means comprises a static mixing tube.

5. The apparatus of claim 1, wherein the mixer means is elastic with regard to the outlet of at least one component so that one or both components can only issue if a minimum pressure is exerted on the component or components.

6. The apparatus of claim 1, wherein the piston of the first cylinder pot is an integral part of the second cylinder pot.

* * * * *